April 21, 1925.
W. E. FOWLER, JR
1,534,582
SECURING BRAKE BEAM SUPPORTS TO TRUCKS
Filed May 15, 1924
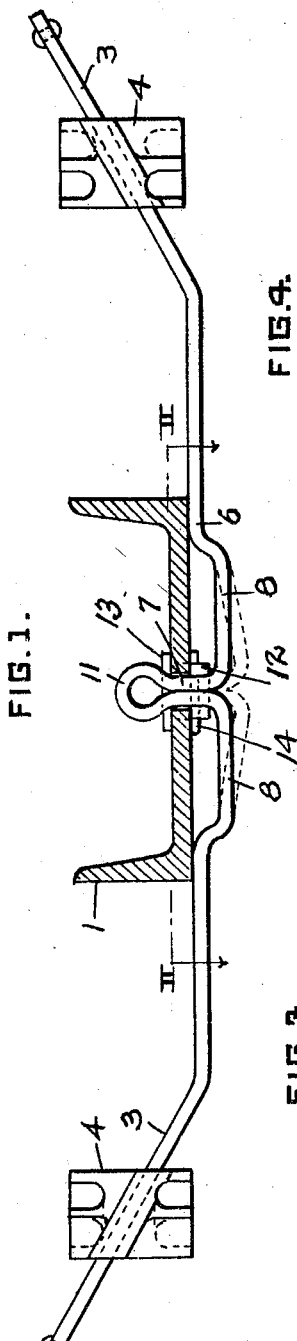

Patented Apr. 21, 1925.

1,534,582

UNITED STATES PATENT OFFICE.

WILLIAM E. FOWLER, JR., OF MOUNT LEBANON, PENNSYLVANIA, ASSIGNOR TO DAVIS BRAKE BEAM COMPANY, OF JOHNSTOWN, PENNSYLVANIA, A CORPORATION OF PENNSYLVANIA.

SECURING BRAKE-BEAM SUPPORTS TO TRUCKS.

Application filed May 15, 1924. Serial No. 713,562.

*To all whom it may concern:*

Be it known that I, WILLIAM E. FOWLER, Jr., residing at Mount Lebanon, in the county of Allegheny and State of Pennsylvania, a citizen of the United States, have invented or discovered certain new and useful Improvements in Securing Brake-Beam Supports to Trucks, of which improvements the following is a specification.

The invention described herein relates to certain improvements in the manner of securing the supporting rails from brake beams to trucks, described and claimed in an application filed May 15, 1924, Serial No. 713,561, said improvements being hereinafter more fully described and claimed.

In the accompanying drawings forming a part of this specification Fig. 1 is a view partly in section and partly in elevation illustrating the improvement claimed herein; Fig. 2 is a sectional plan view on a plane indicated by the line II—II, Fig. 1; Fig. 3 is a transverse section on a plane indicated by the line III—III, Fig. 2; Figs. 4 and 5 are views similar respectively to Figs. 1 and 2, illustrating a modification of the improvement.

Generically stated, the invention described and claimed in the above application consists in so attaching the supporting rail to an element of the truck that it will have a resilient bearing at three spaced points on the truck element; e. g. the spring plank two of such points of bearing being on one side, e. g. the underside of the spring plank, while the third point of bearing which is intermediate the others, is on the upper side of the spring plank. The specific embodiment of the improvement consists in so forming the rail that the intermediate point of bearing of the rail on the truck element is formed by a loop or U-shaped portion adapted to project through an opening in the truck element, the rail being held in position by a key passing through the loop and bearing on the truck element.

In the embodiment of the invention described and claimed herein the supporting rail is constructed substantially similar to the construction of the rail in the above application and is provided with inclined portions 3 on which are movably mounted blocks or shoes 4 provided with means for engaging the tension member of the brake beam with bearing points 6 adapted to bear on the truck element, as for example, the spring plank at points adjacent to the edges of the same and with portions 8 extending from the bearing 6 and so bent as to stand away from the underside of the spring plank. These portions 8 which are resilient, are made integral with a projection 7 adapted to be passed through an opening in the spring plank. As clearly shown in Fig. 2, this opening is made of a key-hole shape having the larger portion 9 of sufficient dimensions to permit of the passage of a head 11 on the projection 7 and a portion $9^a$ having a width substantially less than the width of the head. The large opening is located at one side of the position which the rail is to occupy and the smaller portion $9^a$ in line with such position. In attaching the rail to the spring plank, the spring portions 8 are pressed upwardly until the head 11 passes through the opening when the inner rail is moved laterally moving the part 7 of the projection into the narrow opening and the head overlapping the edges of this narrow opening, as shown in Fig. 1. In order to prevent a lateral movement of the rail, a block 12 is placed in the larger opening, said block being provided with flanges 13 overlapping the edges of the larger opening and is held in position by a key 14 passing through the lower end of the block and bearing against the underside of the spring plank. Where the spring plank is formed by two spaced angle bars, as shown in Figs. 4 and 5, a plate 15 is so secured by riveting or otherwise to the angle bars as to bridge the spaces between them, and the key-hole opening is formed in this spring plank, as shown in Figs. 4 and 5.

I claim herein as my invention:

1. The combination of a truck element having a key-hole shaped opening therethrough and a supporting rail provided intermediate its ends with a projection having a head or enlargement at its end adapted to bear on the element at the sides of the narrower portion of the opening through said element.

2. The combination of a truck element having a key-hole shaped opening therethrough and a supporting rail provided intermediate the ends with a projection having a head or enlargement at its end adapted to bear on the element at the sides of the narrower portion of the opening through said element, and means for preventing lateral movement of the rail from operative position.

3. The combination of a truck element having a key-hole shaped opening therethrough and a supporting rail having spaced points of bearing on one side of the truck element and provided intermediate said points of bearing with a projection having a head or enlargement adapted to bear on the element at the sides of the narrower portion of the opening through the element.

4. The combination of a truck element having a key-hole shaped opening therethrough and a supporting rail having spaced points of bearing on one side of the truck element and provided intermediate said points of bearing with a projection having a head or enlargement adapted to bear on the element at the sides of the narrower portion of the opening through the element, the portions intermediate the bearing portions and the projection being resilient.

5. The combination of a truck element having a key-hole shaped opening therethrough and a supporting rail provided intermediate its ends with a projection having a head or enlargement at its end adapted to bear on the element at the sides of the narrower portion of the opening through said element, and a block fitting into the larger portion of the opening in the truck element and adapted to prevent lateral movement of the rail.

In testimony whereof, I have hereunto set my hand.

WILLIAM E. FOWLER, Jr.